Feb. 26, 1952      J. MORITZ      2,587,367
CONTINUOUS APPARATUS FOR THE MANUFACTURE
OF SUPERPHOSPHATES AND SIMILAR PRODUCTS
Filed Jan. 17, 1946      4 Sheets-Sheet 1
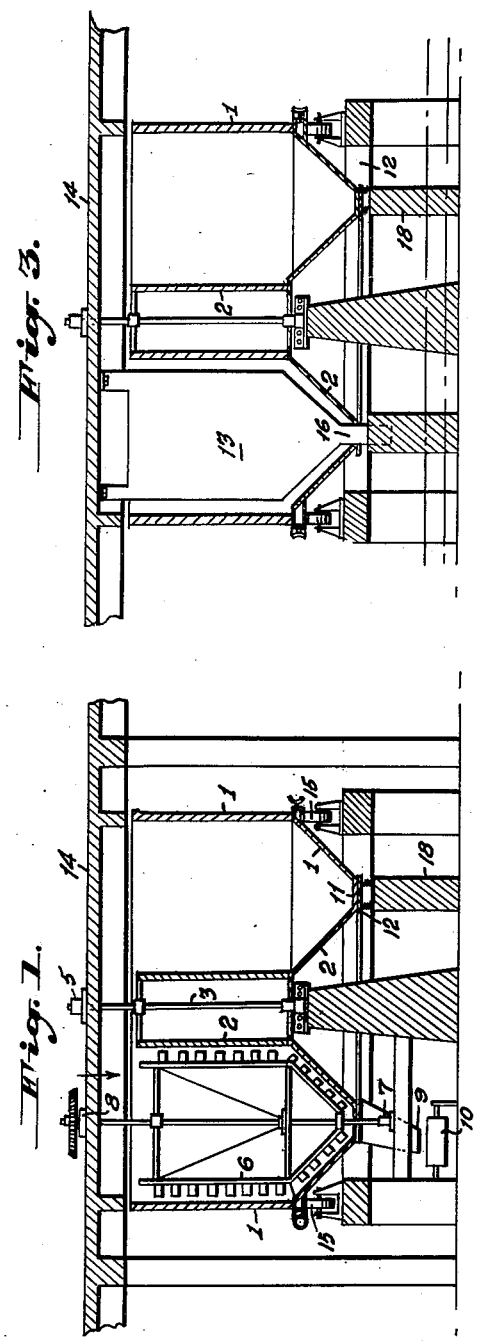
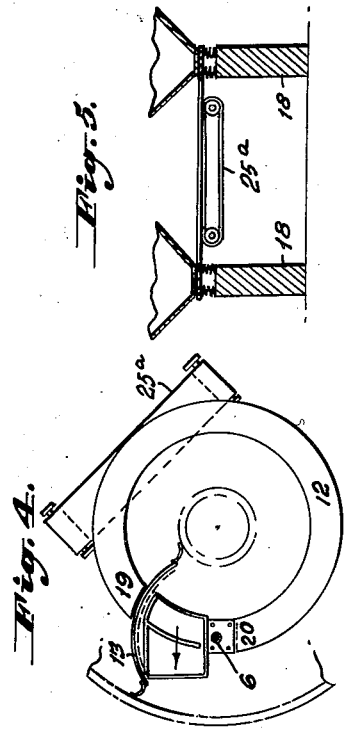
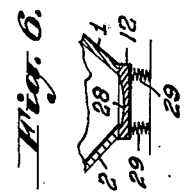
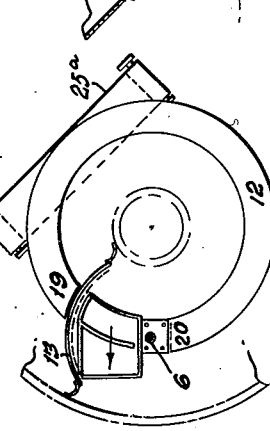
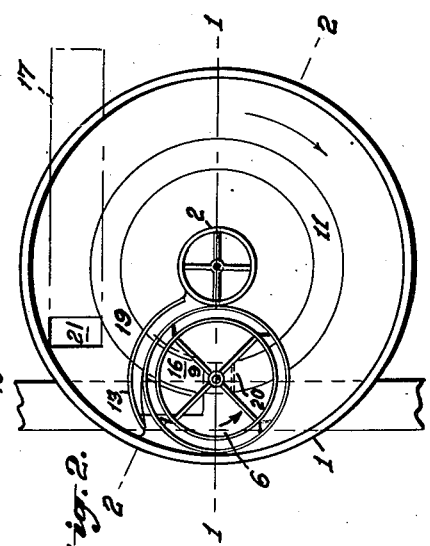
INVENTOR.
Jean Moritz
BY
Attorneys.

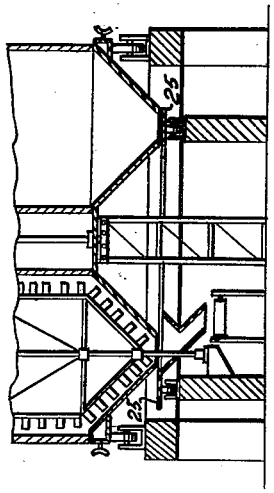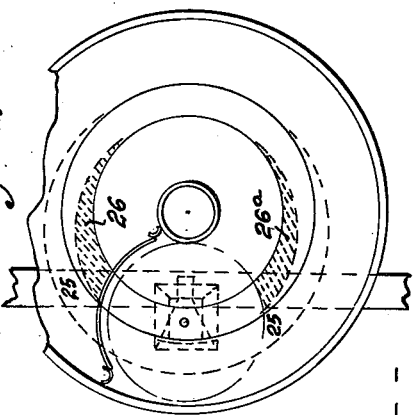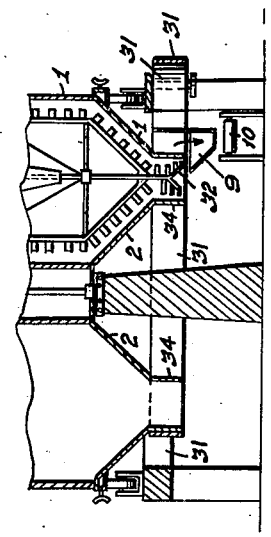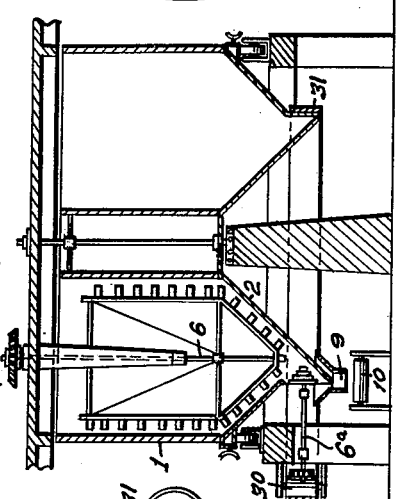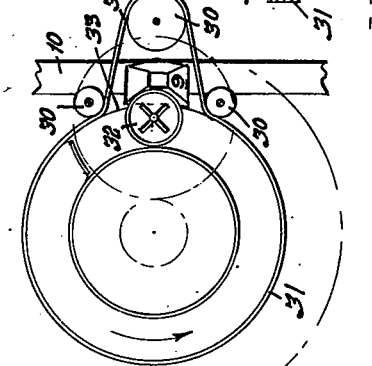
INVENTOR.
Jean Moritz
BY
Attorneys.

Feb. 26, 1952     J. MORITZ     2,587,367
CONTINUOUS APPARATUS FOR THE MANUFACTURE
OF SUPERPHOSPHATES AND SIMILAR PRODUCTS
Filed Jan. 17, 1946     4 Sheets-Sheet 3

INVENTOR.
Jean Moritz
BY
Attorneys.

Feb. 26, 1952 J. MORITZ 2,587,367
CONTINUOUS APPARATUS FOR THE MANUFACTURE
OF SUPERPHOSPHATES AND SIMILAR PRODUCTS
Filed Jan. 17, 1946 4 Sheets-Sheet 4
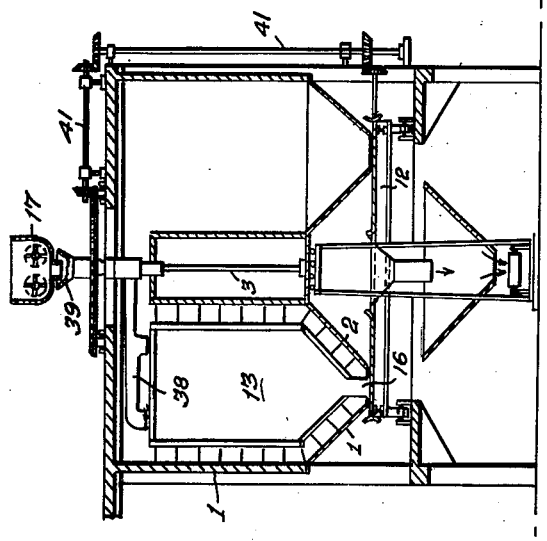
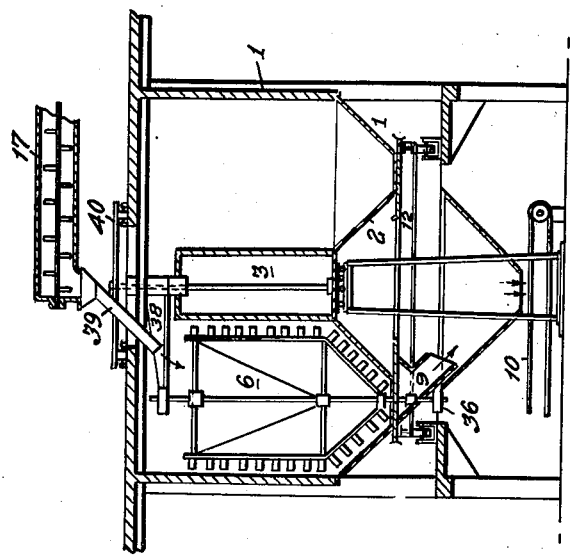
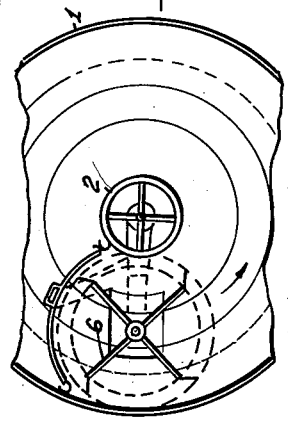
INVENTOR.
Jean Moritz
BY
Glascock Downing Seabold
Attorneys Patented Feb. 26, 1952

2,587,367

UNITED STATES PATENT OFFICE 2,587,367

CONTINUOUS APPARATUS FOR THE MANU-
FACTURE OF SUPERPHOSPHATES AND
SIMILAR PRODUCTS

Jean Moritz, Chatou, France

Application January 17, 1946, Serial No. 641,710
In France January 6, 1939

Section 1, Public Law 690, August 8, 1946
Patent expires January 6, 1959

2 Claims. (Cl. 23—259.2)

Several types of rotary continuous pits exist for the manufacture of superphosphate or phosphate fertilizers and other products, but all the existing designs have the serious inconvenience that an important part of the solidified superphosphate cake rubs against the stationary surfaces.

Experience has shown that the superphosphate cake which thus rubs, first softens, then resumes its shape and yields hard nonporous superphosphate. Furthermore, if the mechanism is stopped, the cake adheres to the fixed part and, when the machine is restarted, the stress exerted for pulling the cake away from the fixed part may be such that the mechanism is deteriorated.

On the other hand, the superphosphate which has been divided by the device used for extracting the superphosphate from the pit, called hereinafter extractor, should no longer rub against any part of the apparatus, especially when it is hot; here again, it softens and agglomerates into hard nodules which are difficult to crush in the apparatus generally used.

Finally, the sliding joints between the fixed parts and the movable parts are often difficult to devise and to maintain.

The present invention has for object an apparatus in which the friction and the sliding joints are eliminated or reduced to the minimum because, on the one hand, the superphosphate cake is sustained at all points, during and after its solidification by supports which accompany the cake in its relative displacements and, on the other hand, the superphosphate is extracted by the extracting apparatus, without friction. These working conditions can be obtained by means of various devices.

Fig. 1 is a view in vertical section of the apparatus along a—a of Fig. 2.

Fig. 2 is a plan view thereof showing the ceiling or lid removed.

Fig. 3 is a view in vertical section along b—b of Fig. 2.

Figures 4 and 5 are partial views, in plan and in vertical section respectively, of a variant of the lower part of the apparatus.

Fig. 6 is a view in section on a larger scale of a part of Fig. 5.

Figures 7 and 8 are partial views in elevation-section and in plan, respectively, of a variant of the lower part of the apparatus shown in Figures 1 and 3.

Fig. 9 is a section-elevation of another variant of this apparatus.

Fig. 10 is a partial elevation-section, and Fig. 11 a view in plan of a variant of the apparatus of Figures 1 to 3.

Figure 12:
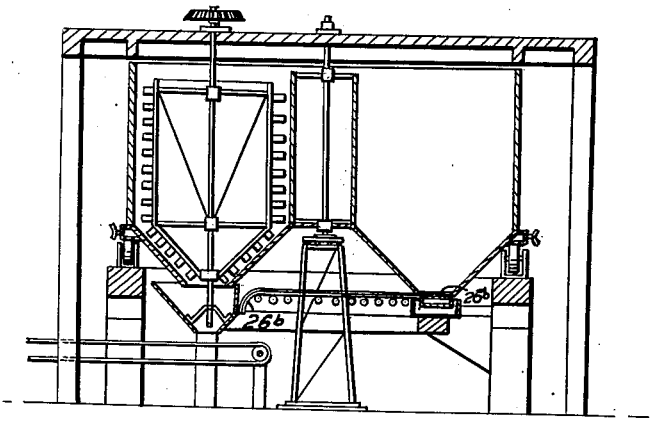
Figure 13:
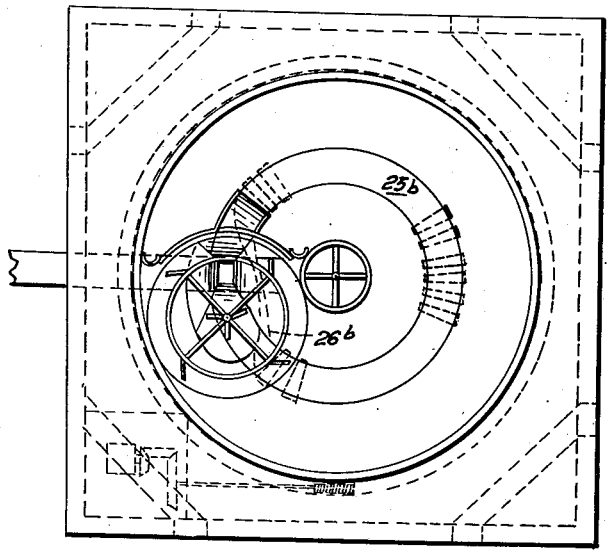

Figures 12 and 13, an elevation in section and a plan view of another variant of the lower part of the same apparatus.

Figures 14, 15 and 16 are views similar to Figures 1 to 3 of a modification of this apparatus.

The vat proper is formed of two parts distant from each other. The outer part is constituted by a rotating cylinder 1 terminated at the bottom by an inner conical element; the inner part is a rotating cylinder 2 terminated at the bottom by an outer conical element mounted on a spindle or rotating in any manner whatever. The unit composed of both cones constitutes a circular vat having a V-shaped bottom. This bottom might also be flat or of U or any other shape, with an annular opening 11 provided in the lowest portion. The top is surmounted by a fixed roof 14 which closes the vat.

The two lower edges of both cones are located in one and the same plane. They are therefore separated by a space 11 of constant width sufficient for allowing the divided material to fall and the drying and cooling air to enter the vat. It is not necessary to mechanically actuate both independent cylinders constituting the walls of the circular vat; it suffices for instance to impart a circular movement to the outer cylinder alone. As soon as a certain quantity, even small, of superphosphate solidifies in the circular vat, the cake constitutes a clutch and the two cylinders rotate together. The annular slot 11 is held closed throughout the part where there is a risk of the mixed material flowing, said material falling at 21 from the continuous or discontinuous mixer 17. This slot is closed by a stationary crown element 12 extending from 19 to 20.

A partition 13 is secured on the one hand to the roof 14 and on the other hand to the crown element 16. The whole is held secured to the ground by feet 18 or by any other means, so that said partition 13 is firmly held at the top and at the bottom.

The rotary extractor 6 is held at the top to the roof by a pivot 8, and at the bottom to the ground by a pivot 7, or only at the top, or only at the bottom. The material divided by the extractor falls by gravity into the funnel 9 and from there on the conveying belt 10; owing to the conical shape of the extracting hole, the material rolls by gravity, without friction.

The metallic ring 12 which closes the bottom of the vat exerts a slight friction on the cake when the latter begins to solidify. The ring has a concave shape as shown at 28 in Fig. 6 to minimize the friction.

Springs 29 control the pressure exerted by said ring on the edges of the cones (Fig. 6).

In order to reduce the friction, the part of the ring where the superphosphate sets can be replaced by a stretched metal belt or the like 25ª, Figs. 4 and 5, which follows the displacement of the superphosphate.

In a modified embodiment, the ring can be continuous, displaceable and eccentric relatively to the general axis as shown at 25, Figs. 10 and 11. The hatched zones 26 and 26ª, Fig. 11, are obturated by stationary members on which the superphosphate cake rubs but, at these two points, this is of no inconvenience because, in the zone 26 where the mass is not solidified, there is no prejudicial friction and, in zone 26ª where the cake has already solidified, the fixed part need not exist or may be located at a slightly lower level, so that there is no friction on the superphosphate cake.

Finally, the space between the two edges can be closed by a distortable displaceable ring 25ᵇ, Figs. 12 and 13. This ring rolls on rollers and is distorted at the place 26ᵇ where the fixed cutting members are located, and resumes the circular shape as soon as it passes beyond said fixed members. It is the unit composed of the edges, the vat and the superphosphate cake which drives the distortable ring. In this arrangement there is no friction of the cake on the members supporting it.

Figs. 7 and 8 illustrate an arrangement in which all friction of the cake is avoided. For that purpose, the wall 2 terminates below the cone by a channel 34 of rectangular cross section in which enters the lower end of the extractor. The latter is provided with teeth and a cone 32 which compel the material to issue through the circular slot 33 provided between the edges of both walls, said slot being closed by a metal belt or the like 31. The opening of said slot is obtained by spacing away the belt, in front of the slot, by means of rollers 30. The material thus falls in a cone 9 which guides the superphosphate towards the conveyor 10. Fig. 9 illustrates a similar arrangement, utilizing an auxiliary extractor 6ª which allows of simplifying the bottom of the vat. The belt 31 stretched by the roller 30 perfectly obturates the space comprised between the two edges of the conical cylinders 1 and 2, and prevents any friction against the superphosphate.

Figs. 14, 15, 16 illustrate in a similar manner to Figs. 1 to 3 a similar device in which the vat is fixed, but it is the ring 12 which rotates and drives the extractor 6 and the partition 13 secured thereto as well as the hopper 9. In this case, the extractor is, preferably, actuated at the bottom 36 and the partition 13 is held at the top by an arm 38. Said arm, rigid with a rotating plate or with a pivot 40 also drives the spout 39 which conveys the viscous material issuing from the mixer 17.

The rotating plate rotates exactly in synchronism with the ring 12 owing to a positive mechanical coupling 41 between the ring 12 and the spindle 3.

All the devices for closing the edges by means of a belt, distortable ring, endless band, auxiliary extractor, are also applicable in this case.

It is believed in view of the foregoing description that a further detailed description of the operation of the invention is unnecessary. Likewise it is believed that the advantages of the invention will be readily apparent.

Having now particularly described and ascertained the nature of my said invention and in what manner the same is to be performed, I declare that what I claim is:

1. Apparatus for the manufacture of superphosphate and like products, comprising an outer cylindrical shell, bearings supporting said shell for rotation about its vertical central axis, an inner cylindrical shell, a central bearing structure supporting said inner shell for free and independent rotation upon the same axis, said shells defining therebetween an annular chamber for receiving the product to be treated, the lower edges of both of said shells being respectively provided with annular portions deflected toward one another to provide a bottom for said chamber and being spaced apart at their points of closest approach to one another to define a ring-shaped aperture about the bottom of said chamber, a vertical baffle plate fixedly supported between said shells and shaped to conform substantially to the profile of said chamber, means for imparting rotary motion to one of said shells, means located to one side of one baffle plate for supplying liquid reaction mixture to said chamber, means located to the opposite side of said baffle plate for extracting solid material from said chamber through a portion of said aperture, means including a flat metallic ring-like closure element lying substantially entirely in a single plane beneath said chamber and arranged to contact said annular portions to close said aperture from a point relatively near the means for supplying liquid to said chamber to a point relatively near said extracting means in the direction of said rotary motion, and means for urging said closure element into contact with the lower margins of said annular portions.

2. Apparatus in accordance with the preceding claim, in which said ring-like closure element has a mean diameter larger than that of said aperture and is supported for movement in its own plane about a center lying to one side of said axis, so as to overlap and close said aperture between said points and to leave open another part of said aperture in the region from which the treated material is to be removed.

JEAN MORITZ.

REFERENCES CITED

The following references are of record in the file of this patent:

UNITED STATES PATENTS

| Number | Name | Date |
|---|---|---|
| 1,318,063 | Forbis | Oct. 7, 1919 |
| 1,376,612 | Forbis | May 3, 1921 |
| 1,428,920 | Sturtevant | Sept. 12, 1922 |
| 1,959,973 | Wellisch | May 22, 1934 |
| 2,100,583 | Wilson | Nov. 30, 1937 |

FOREIGN PATENTS

| Number | Country | Date |
|---|---|---|
| 245,354 | Germany | Dec. 13, 1910 |
| 790,380 | France | Sept. 9, 1935 |